Oct. 19, 1954     O. M. GOVE     2,691,837
CHART AND MAP HOLDER
Filed July 12, 1951
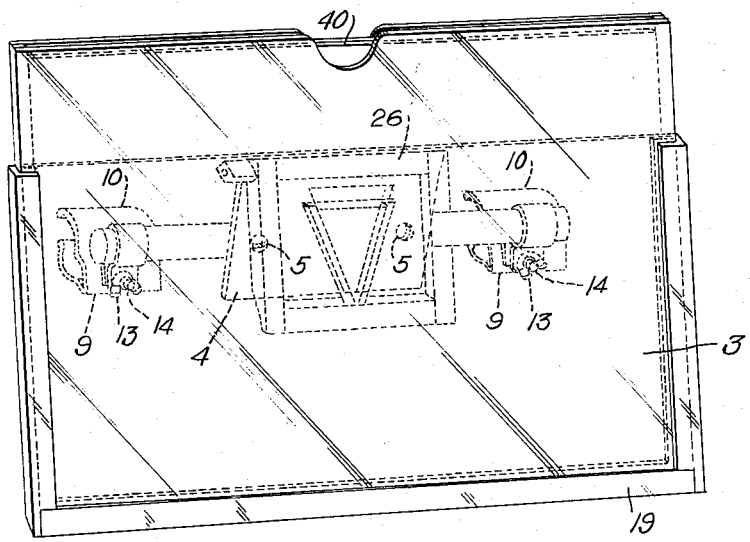
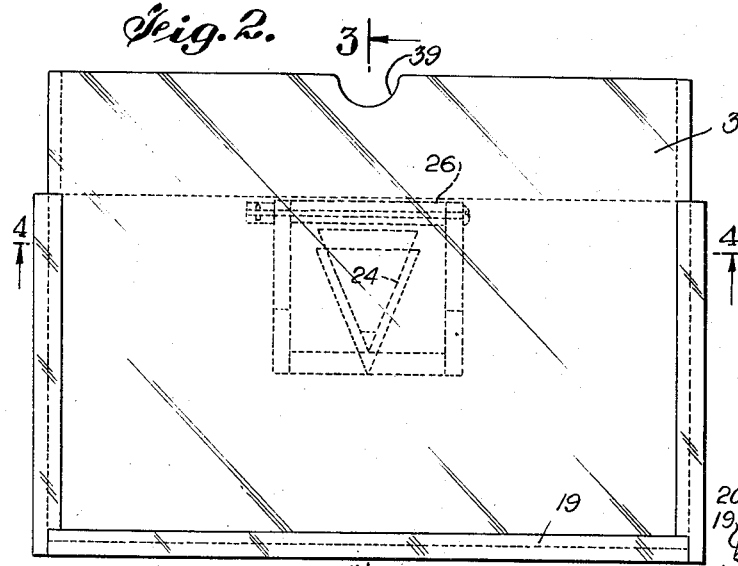
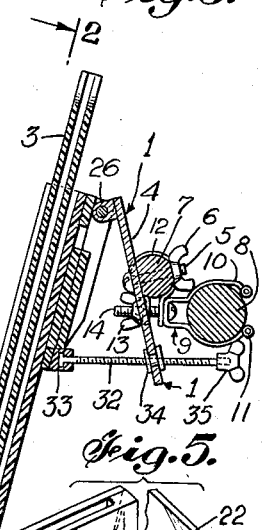
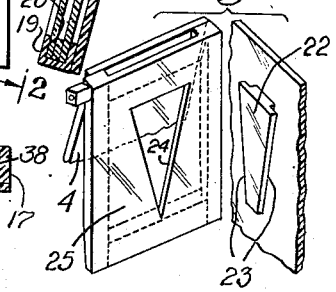
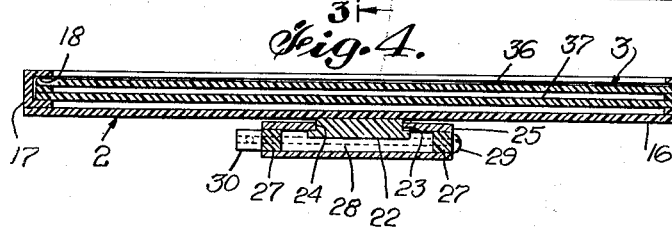
INVENTOR
Ormond M. Gove
BY
ATTORNEY Patented Oct. 19, 1954

2,691,837

UNITED STATES PATENT OFFICE 2,691,837

CHART AND MAP HOLDER

Ormond M. Gove, Garden City, N. Y.

Application July 12, 1951, Serial No. 236,440

5 Claims. (Cl. 40—10)

The present invention relates to a holder for maps, plans, charts, etc. intended to be used by the pilot or driver of a vehicle, the term "vehicle" being herein used in a broad sense to include aircraft, watercraft and landcraft. The terms "maps," "plans" and "charts" are used interchangeably in a broad sense to include any sheet having geographical, topographical or other information indicated or illustrated thereon. While the invention is in no way limited to aircraft, it is particularly suitable and desirable for use by airplane pilots.

When a pilot is making an approach to an airport, he must refer to one or more approach plans or charts indicating the course to be followed by the plane. For example, he may refer first to a map showing the general area and then in the final approach to a larger scale chart showing the airport and its immediate environs with the flight path indicated on the chart. Heretofore, it has been customary for the pilot to lay the chart on his lap. However, this is inconvenient and unsatisfactory. The chart, in that position, is difficult for the pilot to see and accidentally it may slip off his lap at a crucial time.

It is an object of the present invention to avoid these difficulties and disadvantages by providing a novel support for holding the maps or charts where they can be easily seen by the pilot. The problem of providing a satisfactory support is made difficult by the fact that the pilot is virtually surrounded by controls and instruments. It is essential that the map holder shall not interfere with the operation of any of the controls or obscure the pilot's vision of any of the instruments. It is further desirable for the pilot to be able to change quickly from one chart to another.

The present invention achieves these objects in a simple and effective manner by providing a map or chart holder constructed and arranged as described in the following specification and illustrated, by way of example, in the accompanying drawings, in which:

Fig. 1 is a front perspective view of a chart holder in accordance with the invention, showing a chart in place in the holder.

Fig. 2 is a front elevation with the chart removed.

Fig. 3 is a cross-section taken approximately on the line 3—3 in Fig. 2.

Fig. 4 is a horizontal section taken approximately on the line 4—4 in Fig. 2.

Fig. 5 is an exploded perspective view showing removable mounting means forming a part of the holder.

Transport planes of the kind used by airlines, as well as many planes designed for military and private use, have a control wheel mounted at the top of the movable column disposed in front of the pilot's seat. The wheel has a central hub, one or more spokes and a rim. One type of wheel that is widely used has two spokes which are set at opposite sides of the hub and are approximately horizontal when the wheel is in the normal or "straight ahead" position. Instead of being diametrically in line with one another, the two spokes may form a broad inverted or upright V. The spoke and central hub assembly are herein referred to, for convenience, as a "spider." The rim carried by the spider is usually discontinuous. For example, the upper portion of the rim may be omitted or both upper and lower portions may be omitted, leaving only hand grip portions at opposite sides of the wheel.

The chart holder in accordance with the present invention is adapted to be mounted on the control or steering wheel of an aircraft or other vehicle and comprises a base 1 which is mounted on the wheel, a holder or rack 2 hingedly mounted on the base and a slide or receptacle 3 which is adapted to hold the chart and is slidably received in the rack 2.

In the embodiment illustrated in the drawings, the base 1 comprises a base plate 4, preferably formed of transparent material such as a transparent plastic having suitable strength and dimensional stability at the temperatures and under the conditions that may be encountered in service. A thermoplastic acrylic polymer resin, such as that known by the trade name "Plexiglas," has been found satisfactory. The base plate 4 is removably secured by means of spaced bolts 5 and wing nuts 6 to a transverse bar or shaft 7 which, in turn, is secured to the spokes 8 of the steering wheel by means of clamps 9. Each of the clamps 9 comprises opposed spring gripper jaws 10 provided at their ends with rollers 11 and adapted to engage and grip the spokes of the wheel. Each clamp 9 also includes a clamp portion 12 which surrounds the transverse shaft 7 and can be tightened on the shaft by a wing nut 13 on a bolt 14. It will be seen that the shaft 7 can be turned in the clamp portions 12 when the wing nuts 13 are loosened and can be held in any selected position by tightening the wing nuts. This permits the angular position of the base plate 4 to be adjusted as desired.

A simplified mounting of the base plate 4 on the wheel may be effected by attaching the base plate directly to the hub of the wheel, for example with screws or stud bolts similar to the bolts 5 which screw directly into tapped holes provided in the hub. Alternatively, the base plate 4 may be clamped directly to the spokes of the wheel, for example by means of clamps or grippers such as the gripper jaws 10 which, in this event, are secured directly to the base plate 4, for example by means of bolts similar to the bolts 14.

The rack 2 comprises a transparent back plate 16 which is shown as being rectangular in shape. The back plate 16 is provided along its opposite vertical side edges with channel sections 17 providing inwardly facing guide channels 18. A similar channel section 19, having a channel groove 20, extends along the lower edge of the back plate 16. It will be noted that the channel grooves 18 and 20 are spaced outwardly from the front face of the back plate 16.

On the rear face of the back plate 16, there is provided a mounting block 22 located on the upper central portion of the back plate. The side edges 23 of the mounting block 22 are undercut (Fig. 4) and also slope downwardly towards one another so as to give the block a trapezoidal or V shape. The supporting block 22 is removably received and held in a corresponding trapezoidal or V-shaped aperture 24 provided in a support 25 which is hingedly connected to the base plate 4 by means of a hinge 26. The arrangement is such that, by inserting the mounting block 22 through the aperture 24 of the support 25 and then permitting the rack 2 with its mounting block 22 to move downwardly so that the edges of the aperture 24 lock under the undercut edges of the mounting block 22, the rack is firmly and rigidly secured to the support 25. It can, however, be quickly released from the support merely by lifting up on the rack 2. By properly inclining the lateral edges 23 of the mounting block 22 and the parallel lateral edges of the aperture 24, suitable wedging action is obtained, tending to lock the rack in place while at the same time permitting its quick removal.

The hinge connection 26 between the support 25 and the base plate 4 comprises spaced, parallel, rearwardly projecting ribs 27 provided on the rear face of the support 25 adjacent its lateral edges and a transverse bar 28 which extends along the upper edge of the base plate 4 and fits between the two ribs 27 which thus engage the ends of the bar 28. A bolt 29 having a nut 30 extends through a hole extending lengthwise through the bar 28 and aligned holes through the two ribs 27. The support 25 and associated ribs 27 have sufficient resiliency that, by tightening the nut 30, the ribs 27 can be pressed tightly against the end of the bar 28 provided on the base plate 4 so as to clamp the support 25, and hence the rack 2, in any desired angular position relative to the base plate 4. The axis of the hinge is preferably horizontal in the normal "straight ahead" position of the wheel.

Additional means may, if desired, be provided for holding the rack 2 in adjusted angular position. Thus, as illustrated in Fig. 3, a threaded shaft 32 is rotatably and pivotally connected to the support 25 near its lower edge by means of a thrust bearing 33. The threaded shaft 32 extends through a follower nut 34 carried by the lower portion of the base plate 4, there being sufficient play either between the nut 34 and the shaft 32 or between the nut 34 and the base plate 4 to permit slight angular movement of the shaft relative to the base plate. A wing nut 35 is locked on the end of the shaft to provide means for turning the shaft 32 in its bearing 33 and in the nut 34. As the shaft is rotated, the support 25, and hence the rack 2, are swung about the hinge 26 to vary the angular relationship between the rack and the base plate 4. It has been found that the rack 2 should be inclined to the horizontal and to the vertical at an angle such as that shown in Fig. 3. However, the exact angular position may be readily adjusted as desired to suit a particular vehicle or a particular pilot.

The receptacle or slide 3 comprises two rectangular sheets or plates of transparent material 36 and 37 which are spaced apart from one another approximately the thickness of a chart or map and are joined along their side and bottom edges by a spacing strip 38. The upper edge is left open so that a chart can be readily inserted between the two plates 36, 37. If desired, one of the plates, for example the rear plate 37, may be made slightly higher than the other to facilitate insertion of a chart. An arcuate notch 39 is preferably provided in the upper edges of the plates 36, 37 so that an edge portion of a chart 40 (Fig. 1) held in the receptacle 3 may readily be gripped in order to remove the chart quickly and easily.

As will be seen from the drawings, the slide or receptacle 3 is substantially rectangular and of such size and shape as to slide into the channels 18 of the rack 2. When the chart holder is to be used on an airplane where the wheel is never turned more than a few degrees in one direction or the other, the sliding fit between the receptacle 3 and the rack 2 is made fairly free while yet holding the receptacle without excessive play. If the holder is to be used on an automobile or other vehicle where the steering wheel may be turned more than 90° in each direction from the normal straight ahead position, it is desirable to have the receptacle 3 fit sufficiently snugly in the rack 2 so that it will not fall out by its own weight when the rack is inverted by rotation of the wheel. At the same time, the receptacle 3 should be quickly and easily removable from the rack 2. It will be seen that the receptacle 3 is positioned with respect to the rack 2 by the side channels 18 and also by the bottom channel 20. The latter acts as an abutment to limit downward movement of the receptacle in the side channels 18. The receptacle 3 projects up above the back plate 16 of the rack 2 and the entire front face of the receptacle 3 is unobstructed except for the narrow edge engaged by the side channel members 17 and bottom channel member 19. Moreover, as seen in Figs. 3 and 4, the rear plate 37 of the receptacle 3 is spaced from the back plate 16 of the rack 2 so that there is no rubbing or scratching of either plate. While, for convenience and clarity of description, the plates 36 and 37 have been referred to as "front" plate and "rear" plate, respectively, it will be appreciated that the receptacle 3 is reversible so that either side of a double-face chart can be seen by placing the receptacle 3 in the rack 2 with the proper side facing out. Alternatively, two single faced charts can be put in the receptacle 3 back to back. In stating that the plates 36 and 37 are spaced apart a distance of the order of the thickness of a chart, it will be understood that this is intended to include such spacing as to receive one or several charts, as desired.

The receptacle 3 and the rack 2, preferably including the channel members 17 and 19, the mounting block 22 and the support 25, are formed of transparent material, for example a plastic as described above having suitable strength and stability characteristics.

While it has been found desirable to make the rack 2 readily removable from the support 25 and also removable from the base plate 4, as described above, the construction may be simplified by hingedly connecting the back plate 16 of the rack 2 to the base plate 4, the removable connection being omitted.

The way in which the map holder in accordance with the present invention is used will be readily understood from the foregoing description. A map or chart is inserted in the receptacle 3 which in turn is slipped into the rack 2, the latter being held at a selected angle by the hinge 26 and adjusting screw 32. If it is desired to refer to the opposite side of a double-sided chart, the receptacle 3 is merely lifted out of the rack 2, reversed and placed again in the rack with the other side out. A pilot may, if desired, be supplied with a number of receptacles 3 which can be suitably stored within his reach so that he can select the receptacle containing the chart he desires to use and place it in the rack 2. At any time when the map holder is not in use, the entire rack 2 may be readily removed from the base, merely by lifting it up to disengage the mounting block 22 from the aperture in the support 25. However, since the rack 2 is transparent and hence does not obscure the pilot's vision in any way when there is no chart in the holder, there is no necessity of removing it.

While the invention has been described with reference to the particular embodiment shown by way of example in the drawings, it is not limited to this particular embodiment.

What I claim and desire to secure by Letters Patent is:

1. In a chart holder for aircraft having a steering wheel, a base, means for securing the base to the steering wheel, a support hingedly mounted on the base to swing about a normally horizontal axis means for adjustably securing the support in selected angular position relative to the base, said support having an aperture with downwardly converging side edges, a rack comprising a plate of transparent material, a projection provided on the rear of said plate and of a shape and size to be received in said aperture, said projection having converging undercut side edges interlocking with corresponding side edges of said aperture to secure said rack removably on said support and means for removably holding a chart on said plate.

2. In a chart holder for aircraft having a steering wheel, a base, means for securing the base to the steering wheel, a supported hingedly mounted on the base to swing about a normally horizontal axis, means for releasably securing the support in selected angular position relative to the base, said support having an aperture with downwardly converging side edges, a rack comprising a plate of transparent material, a projection provided on the rear of said plate midway between the side edges thereof, said projection being received in said aperture and having converging undercut side edges releasably interlocking with corresponding side edges of said aperture to secure said rack on said support, said rack being quickly releasable from the support by upward movement of the rack relative to said support and means for removably holding a chart on said plate.

3. In a chart holder for aircraft having a steering wheel, a base, means for securing the base to the steering wheel, a support hingedly mounted on the base to swing about an axis that is horizontal when the steering wheel is in straight-ahead position, means for adjustably securing the support in selected angular relation to said base, said support having an aperture and downwardly converging side edges, a rack comprising a plate of transparent material having spaced parallel guideways extending along opposite vertical side edges of the front face of said plate and a forwardly projecting abutment at the bottom edge of said plate, a projection provided on the rear of said plate midway between the side edges thereof, said projection being received in said aperture and having downwardly converging undercut side edges releasably interlocking with corresponding side edges of said aperture to secure said rack on said support, said rack being quickly releasable from the support by upward movement of the rack relative to said support, and a slide slidably received in said guideways of the rack and comprising spaced parallel rectangular plates of transparent material joined together along side and lower edges, the upper edge being left open for insertion of a chart between said plates.

4. In a chart holder for aircraft having a steering wheel, a base, means for removably securing the base to said steering wheel, a support hingedly mounted on the base to swing about an axis that is horizontal when the steering wheel is in straight-ahead position, means for swinging said support about said hinge and for adjustably securing said support in selected angular relation to said base, said support having an aperture with downwardly converging side edges, a rack comprising a rectangular plate of transparent material having side and bottom edge portions that extend forwardly and then inwardly to provide channels along the side and bottom edges of said plate, a projection provided on the rear of said plate midway between the side edges thereof, said projection being received in said aperture of said support and having converging undercut side edges releasably interlocking with corresponding side edges of said aperture to secure said rack on said support, said rack being quickly releasable from the support by upward movement of the rack relative to said support, and a slide slidably received in said channels of the rack and comprising spaced parallel rectangular plates of transparent material joined together along side and lower edges, the upper edge being left open for insertion of a chart between said plates, said slide having a length slightly less than that of said rack so as to fit in the channels at the side edges of the rack and having a height greater than that of said rack so that the upper portions of said slide project appreciably above the upper edge of said rack.

5. A chart holder for a vehicle having a steering wheel, comprising a base on the steering wheel, a support hingedly mounted on the base to swing about a normally horizontal axis, said support having an aperture with downwardly converging side edges, means for adjustably securing the support in selected angular position relative to the base, a rack having spaced parallel guideways, a projection provided on the rear of said rack, said projection being received in said aperture and having downwardly converging undercut side edges releasably interlocking with the side edges of said aperture to hold said rack removably on said support, and a slide slidably received in the guideways of the rack and comprising transparent plates spaced apart from one another and joined together along side and lower edges, the upper edge being open to receive a chart between said plates.

References Cited in the file of this patent

UNITED STATES PATENTS

| Number | Name | Date |
| --- | --- | --- |
| 1,020,351 | Hill | Mar. 12, 1912 |
| 1,607,752 | Higdon | Nov. 23, 1926 |
| 1,680,998 | Krantz | Aug. 14, 1928 |
| 1,773,337 | Barlow | Aug. 9, 1930 |
| 2,165,389 | Krook | July 11, 1939 |
| 2,176,708 | Douglas | Oct. 17, 1939 |
| 2,535,576 | Hodges | Dec. 26, 1950 |